(12) United States Patent
Kosonocky

(10) Patent No.: US 11,360,504 B2
(45) Date of Patent: Jun. 14, 2022

(54) ADAPTABLE VOLTAGE MARGIN FOR A PROCESSOR

(71) Applicant: ADVANCED MICRO DEVICES, INC., Santa Clara, CA (US)

(72) Inventor: Stephen Victor Kosonocky, Fort Collins, CO (US)

(73) Assignee: Advanced Micro Devices, Inc., Santa Clara, CA (US)

(*) Notice: Subject to any disclaimer, the term of this patent is extended or adjusted under 35 U.S.C. 154(b) by 153 days.

(21) Appl. No.: 15/990,096

(22) Filed: May 25, 2018

(65) Prior Publication Data

US 2019/0361485 A1 Nov. 28, 2019

(51) Int. Cl.
*G06F 1/08* (2006.01)
(52) U.S. Cl.
CPC ..................... *G06F 1/08* (2013.01)
(58) Field of Classification Search
CPC ................. G06F 1/3296; G06F 1/08
See application file for complete search history.

(56) References Cited

U.S. PATENT DOCUMENTS

| | | | |
|---|---|---|---|
| 6,845,456 B1 | 1/2005 | Menezes et al. | |
| 7,853,808 B2 | 12/2010 | Kim et al. | |
| 8,661,274 B2 | 2/2014 | Hansquine et al. | |
| 9,354,690 B1* | 5/2016 | Joffe | G06F 1/26 |
| 2004/0263212 A1 | 12/2004 | Wald | |
| 2005/0062507 A1 | 3/2005 | Naffziger et al. | |
| 2008/0258700 A1 | 10/2008 | Block | |
| 2010/0019834 A1* | 1/2010 | Zerbe | G06F 1/26 |
| | | | 327/538 |
| 2013/0232347 A1* | 9/2013 | Pinto | H03K 19/0016 |
| | | | 713/300 |
| 2015/0022272 A1 | 1/2015 | Felix et al. | |
| 2015/0180482 A1 | 6/2015 | Bourstein | |
| 2015/0192942 A1* | 7/2015 | Smith | G05F 1/462 |
| | | | 327/540 |

(Continued)

FOREIGN PATENT DOCUMENTS

| | | |
|---|---|---|
| EP | 1422595 A2 | 5/2004 |
| WO | 2004023278 A2 | 3/2004 |

OTHER PUBLICATIONS

International Search Report and Written Opinion dated Oct. 1, 2019 for International Application No. PCT/US2019/033507, 12 pages.

(Continued)

*Primary Examiner* — Albert Wang

(57) ABSTRACT

A processor adjusts the voltage margin of a supply voltage based on a sampled clock frequency. The processor generates the supply voltage by combining the voltage margin with a specified nominal voltage, and provides the supply voltage to a processor module, such as graphics processing unit (GPU). In addition, an adaptive clock module (e.g., a digital frequency-locked loop) generates a clock signal for the processor module, wherein the frequency of the clock signal varies at least in part based on the supply voltage. The processor samples the frequency of the clock signal and adjusts the voltage margin based on the sampled frequency. The processor thereby keeps excursions in the clock frequency within a specified limit, thus supporting a relatively stable clock frequency.

20 Claims, 4 Drawing Sheets

(56) References Cited

U.S. PATENT DOCUMENTS

| | | | |
|---|---|---|---|
| 2015/0241955 A1* | 8/2015 | Kosonocky | G06F 1/3296 |
| | | | 713/320 |
| 2015/0253836 A1* | 9/2015 | Mylius | G06F 1/3296 |
| | | | 713/320 |
| 2017/0075402 A1* | 3/2017 | Pant | G06F 1/04 |
| 2017/0102761 A1* | 4/2017 | Campisano | G06F 1/08 |
| 2017/0199491 A1* | 7/2017 | Kawakatsu | G03G 15/80 |

OTHER PUBLICATIONS

International Preliminary Report on Patentability dated Dec. 10, 2020 for International Application No. PCT/US2019/033507, 9 pages.

Extended European Search Report dated Feb. 10, 2022 for European Application No. 19807804.0, 10 pages.

\* cited by examiner

ADAPTABLE VOLTAGE MARGIN FOR A PROCESSOR

BACKGROUND

A processor typically employs one or more clock signals to synchronize operations at the synchronous logic modules of the processor. Thus, the one or more clock signals govern various operations at the processor including instruction execution, data flow, inter-module communication, and the like. The frequency of a processor clock signal therefore governs the speed with which an associated module of the processor can execute its operations. Furthermore, variations in operating conditions at the processor can cause corresponding changes in the timing requirements of the synchronous logic modules, which in turn can adversely affect processor operations at a given clock frequency. For example, noise in the voltage of a processor power supply can vary above (overshoot) or below (droop) a nominal voltage level, and these variations can cause corresponding changes in the timing requirements.

To prevent or reduce timing errors resulting from the variations in processor operating conditions, a processor can employ an adaptive clock module, whereby the adaptive clock module changes the frequency of a generated clock signal based on changes in the voltage supplied to a processor module. The adaptive clock module can include, for example, delay-locked loops (DLLs) or frequency-locked loops (FLLs) to lock the frequency of the clock signal to the supply voltage. However, the variations in the frequency of the generated clock signal can adversely affect processor operations for certain applications and systems, such as gaming applications and shared server systems, that benefit from reduced variations in processor clock frequency. A processor can reduce the variations in clock frequency by increasing the supply voltage above a threshold amount at the cost of increased power consumption.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for adjusting the voltage margin of a supply voltage of a processor based on a sampled clock frequency. The processor generates the supply voltage by combining the voltage margin with a specified nominal voltage, and provides the supply voltage to a processor module, such as graphics processing unit (GPU). In addition, an adaptive clock module (e.g., a digital frequency-locked loop) generates a clock signal for the processor module, wherein the frequency of the clock signal varies at least in part based on the supply voltage. The processor samples the frequency of the clock signal and based on the sampled frequency adjusts the voltage margin. The processor thereby keeps excursions in the clock frequency within a specified limit, thus supporting a relatively stable clock frequency. The stable clock frequency supports an improved user experience in a variety of applications, such as server systems wherein the clock frequency impacts client billing and gaming applications wherein a stable clock frequency enables a more repeatable user experience.

Figure 1:
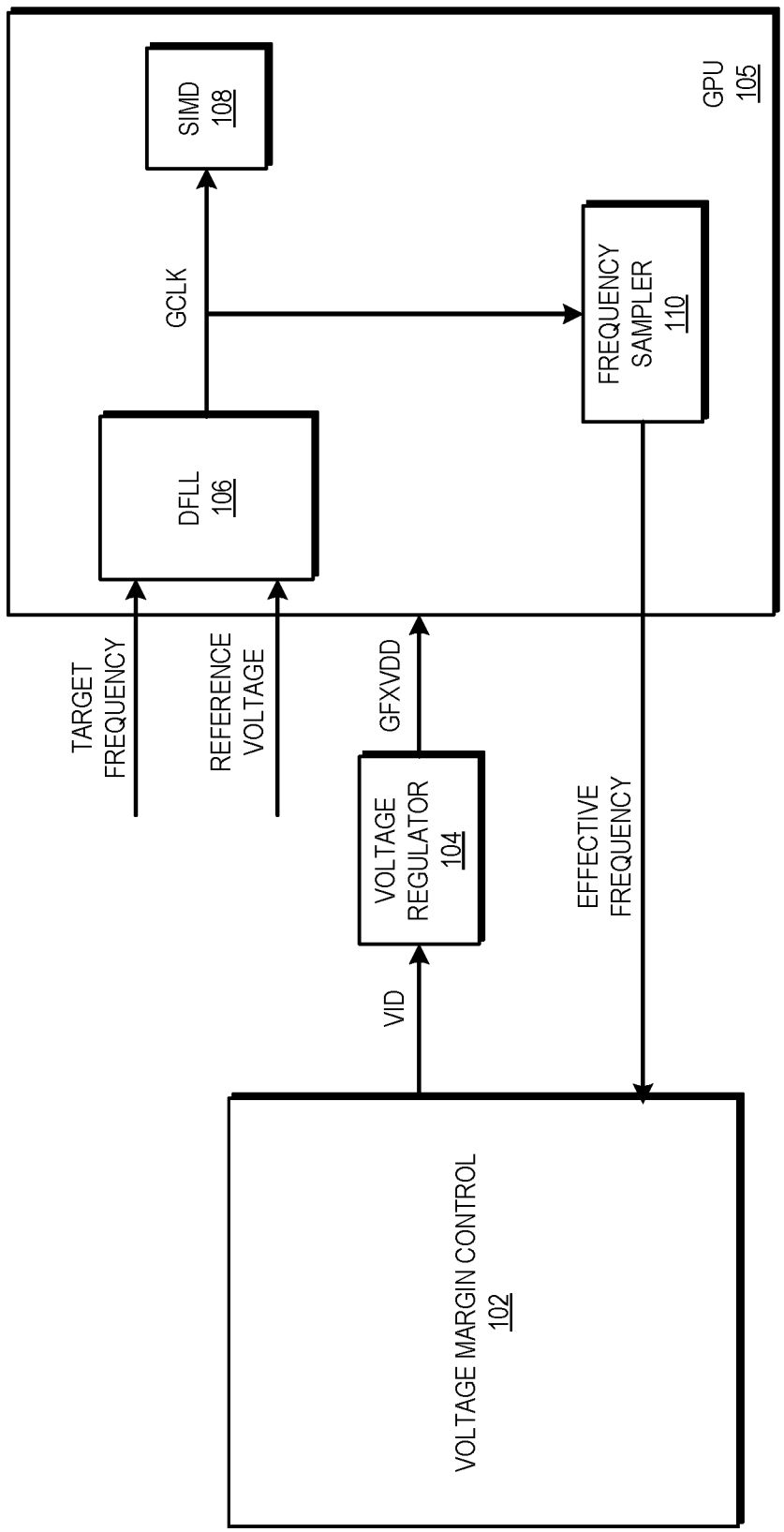
FIG. 1 is a block diagram of a processor including an adaptive clock module that adjusts a voltage margin of a supply voltage based on variations in a sampled clock frequency in accordance with some embodiments.

FIG. 1 illustrates a processor 100 that adjusts a voltage margin of a supply voltage based on variations in a sampled clock frequency in accordance with some embodiments. The processor 100 executes sets of instructions (e.g., computer programs) to carry out specified tasks for an electronic device. Examples of such tasks include controlling aspects of the operation of the electronic device, displaying information to a user to provide a specified user experience, communicating with other electronic devices, and the like. Accordingly, in different embodiments the processor 100 is employed in one of a number of types of electronic device, such as a desktop computer, laptop computer, server, game console, tablet, smartphone, and the like.

To support execution of the sets of instructions, the processor 100 includes a plurality of processor cores (not shown at FIG. 1). In some embodiments, each processor core includes one or more instruction pipelines to fetch instructions, decode the instructions into corresponding operations, dispatch the operations to one or more execution units, execute the operations, and retire the operations. In the course of executing instructions, the processor cores generate graphics operations and other operations associated with the visual display of information. Based on these operations, the processor cores provide commands and data to a graphics processing unit (GPU) 105, illustrated at FIG. 1.

The GPU 105 receives the commands and data associated with graphics and other display operations from the plurality of processor cores. Based on the received commands, processing units of the GPU 105, such as single-instruction multiple-data processing unit 108 (referred to as SIMD 108) executes operations to generate frames for display. Examples of operations include vector operations, drawing operations, and the like.

As is understood by one skilled in the art, the processing units (such as SIMD 108) of the GPU 105 include synchronous logic modules whose operations are governed by a supply voltage (designated GFXVDD) provided to the GPU 105 and a clock signal (designated GCLK) provided to the processing units. To generate the clock signal GCLK the GPU 105 includes a digital frequency-locked loop (DFLL) 106. It will be appreciated that in other embodiments a different adaptive clock system, such as a delay-locked loop, an analog frequency-locked loop, a clock stretcher, and the like, is used to generate the clock signal GCLK. The DFLL 106 generates the clock signal GCLK based on two parameters: a reference voltage generated by a stable voltage reference (not shown) and a target frequency value. In some embodiments, the target frequency value is stored at a register (not shown) of the processor 100, and is set or altered according to changing operating conditions, on changes in a power mode of the processor 100, and the like. The frequency of the clock signal GCLK thus depends in part on the reference voltage and the target frequency value. In addition, because the logic modules of the DFLL 106 employ GFXVDD as a supply voltage, the frequency of the clock signal GCLK varies based on variations in GFXVDD. The DFLL thus ensures that the clock signal GCLK adapts to noise and other variations in GFXVDD.

The GPU 105 further includes a frequency sampler 110 that periodically samples the frequency of the clock signal GCLK. In some embodiments, the frequency sampler 110 averages the frequency of the clock signal GCLK over a specified period of time, such as 1 millisecond (ms). Based on the sampled frequency, the frequency sampler 110 generates a value, referred to herein as the effective frequency of the clock signal GCLK.

To generate GFXVDD, the processor 100 includes a voltage margin control module (VMC) 102 and a voltage regulator 104. The voltage regulator 104 generates the voltage GFXVDD based on a value designated VID. In some embodiments the value VID is a digital value, and the voltage regulator 104 adjusts one or more potentiometers or other adjustable circuit components to set the voltage GFXVDD.

As described further herein, the VMC 102 generates the value VID by combining a nominal voltage value and an adjustable voltage margin value. The VMC 102 adjusts the voltage margin value in response to changes in the effective frequency indicated by the frequency sampler 110, resulting in a corresponding adjustment to VID. The adjustment in VID results in a change in GFXVDD as generated by the voltage regulator 104, which in turn results in a change in the frequency of the clock signal GCLK. Thus, in combination with the DFLL 106 and the frequency sampler 110, the VMC 102 and the voltage regulator 104 establish a control loop that maintains variations in the frequency of the clock signal GCLK within specified limits.

Figure 2:
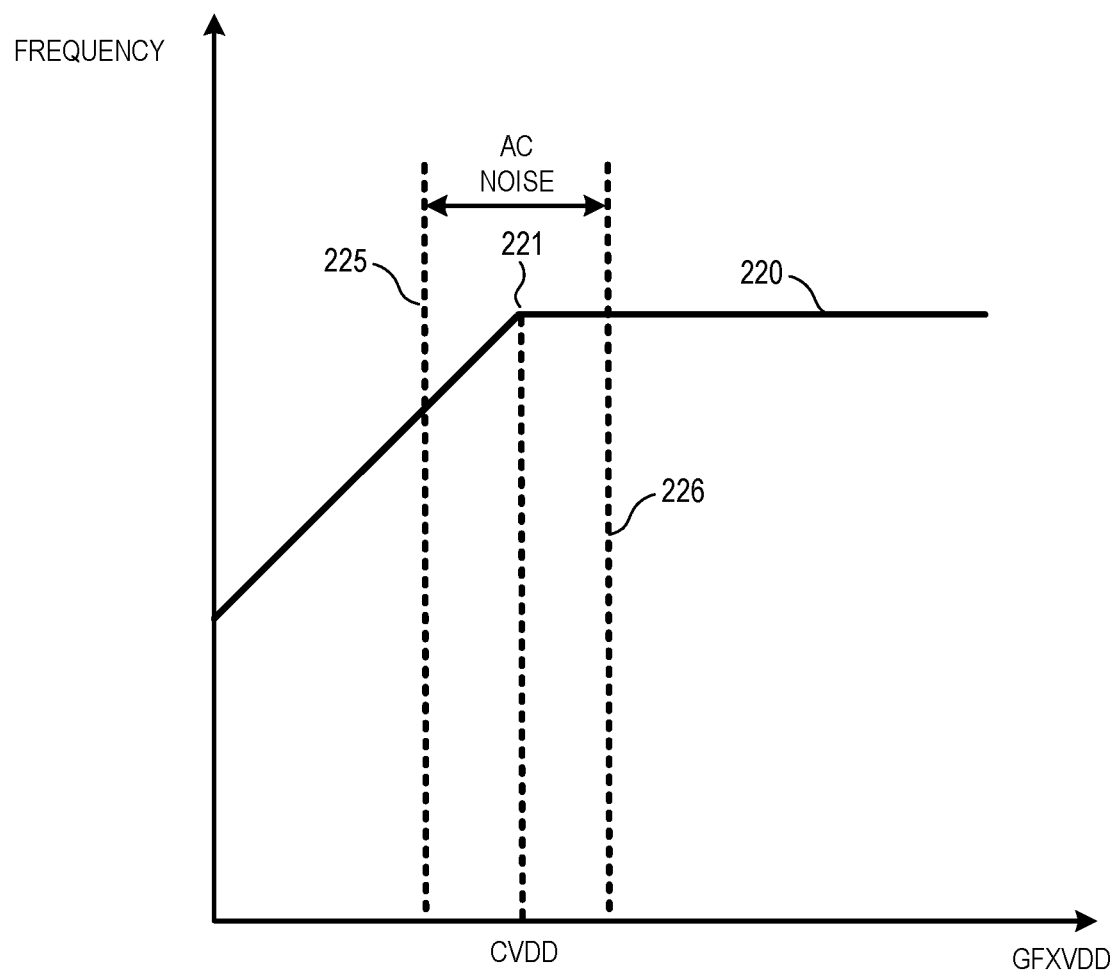
FIG. 2 is a diagram illustrating an example of the processor of FIG. 1 adjusting a voltage margin of a supply voltage based on the variations in the sampled clock frequency in accordance with some embodiments.

FIG. 2 is a graph 200 illustrating an example of the processor 100 controlling the frequency of the clock signal GCLK by controlling changes in GFXVDD in accordance with some embodiments. In the illustrated example, the graph 200 includes an x-axis representing GFXVDD and a y-axis representing the frequency of the clock signal GCLK. The graph 200 also depicts a curve 220 indicating the changes in the frequency of GCLK based on changes in GFXVDD. In the depicted example, because of the behavior of the DFLL 106, the frequency of the clock signal GCLK is relatively invariant with respect to the GFXVDD above a point 221. Below the point 221, the frequency of the clock signal GCLK varies with respect to GFXVDD.

As illustrated by FIG. 2, the voltage corresponding to point 221 is designated CVDD. Thus, CVDD represents the level of GFXVDD at which the frequency of the clock signal GCLK becomes relatively fixed. Graph 200 also illustrates a range with respect to CVDD, whereby the range is defined by limits 225 and 226. The limits 225 and 226 represent the maximum expected variations in the voltage GFXVDD due to alternating current (AC) noise. Thus, to maintain a relatively fixed frequency for the clock signal GCLK, a conventional processor sets the voltage GFXVDD so that the lower limit 225 is above CVDD. However, for some workloads or operating conditions, GFXVDD will only rarely approach the lower limit 225, and therefore the conventional approach often consumes an undesirable amount of power.

In contrast to the conventional approach, the processor 100 employs the VMC 102 to maintain GFXVDD within a relatively narrow range around CVDD and thereby maintain a relatively fixed frequency for GCLK. For example, in response to the effective frequency of the clock signal GCLK beginning to drop (indicating that the voltage-frequency relationship is governed by the curve below point 221), the VMC 102 increases the voltage margin, thereby increasing GFXVDD and maintaining the frequency of the clock signal GCLK at a stable level. In response to the effective frequency of GCLK maintaining the stable level (indicating that the voltage-frequency relationship is governed by the curve above point 221), the VMC 102 decreases the voltage margin, ensuring that GFXVDD does not rise above CVDD beyond a threshold limit, and thus conserves power.

Figure 3:
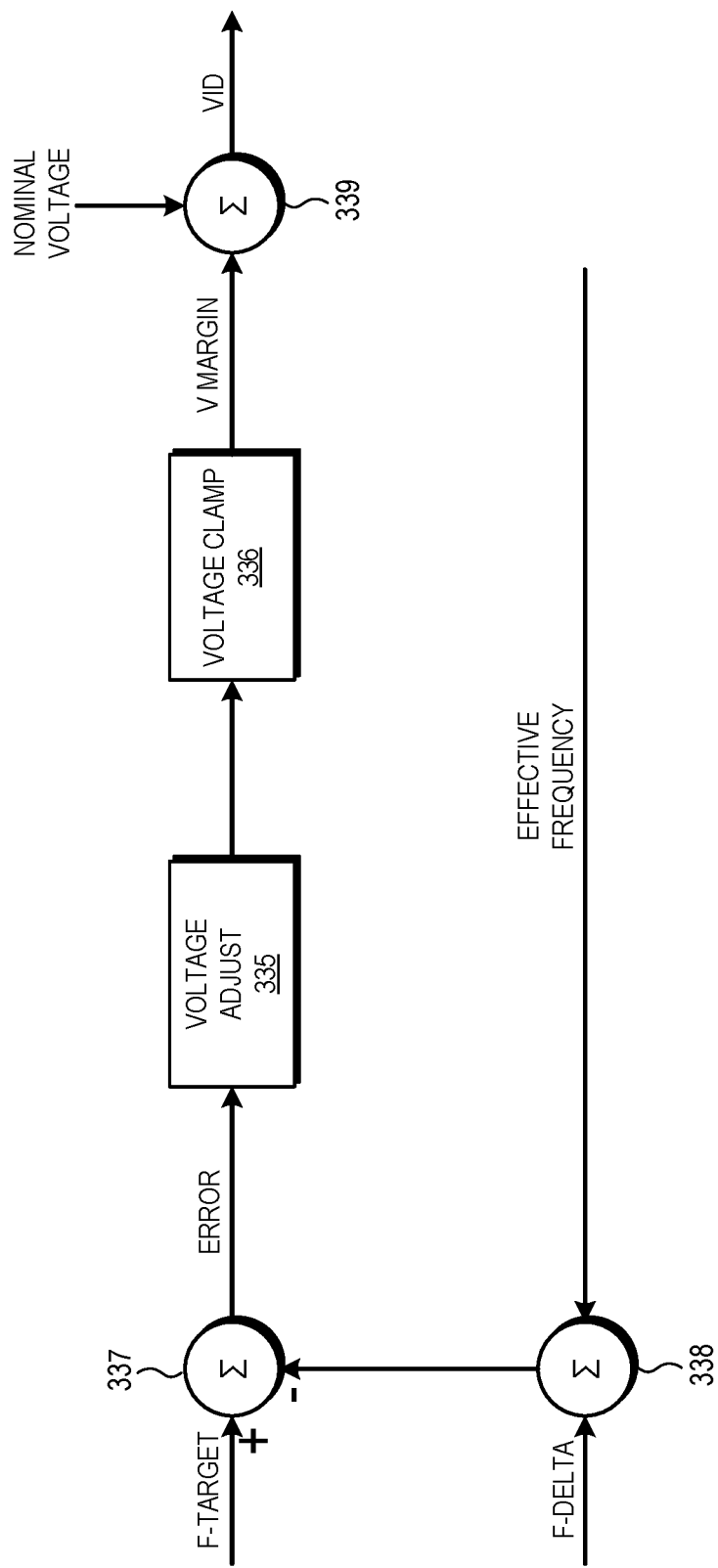
FIG. 3 is a block diagram of a voltage margin control module of the processor of FIG. 1 in accordance with some embodiments.

FIG. 3 illustrates a block diagram of the VMC 102 in accordance with some embodiments. In the illustrated example, the VMC 102 includes a voltage adjustment module 335, a voltage clamp 336, and summers 337, 338, and 339. In some embodiments, each of the modules 335-339 is a portion of firmware executing at the processor 100. In other embodiments, each of the modules 335-339 is a hardware module including components connected and configured to perform the operations described further below. In still other embodiments, the modules 335-339 represent a combination of firmware and hardware.

The summer 338 combines (e.g., adds) the effective frequency value identified by the frequency sampler 110 (FIG. 1) with a value designated F-Delta. The value F-Delta represents the specified maximum allowed variation in the frequency of the clock signal GCLK. Thus, the output of the summer 338 indicates the amount by which the effective frequency falls outside a specified allowed variation in frequency of the clock signal GCLK.

The summer 337 generates a value, designated ERROR, indicative of the difference between the output of the summer 338 and the target frequency of the clock signal GCLK. The voltage adjust module 335 generates an adjustment to the voltage margin based on the ERROR value. In some embodiments, the voltage adjust module 335 selects between a fixed positive adjustment value (e.g., +1) and a fixed negative adjustment value (e.g., −1) based on the ERROR. In other embodiments the voltage adjust module 335 uses a proportional adjustment value to the magnitude and sign of the error. Thus, for example, if the ERROR value indicates that the effective frequency is below the target frequency, the voltage adjust module 335 selects the positive adjustment, and if the ERROR value indicates that the effective frequency is above the target frequency, the voltage adjust module 335 selects the negative adjustment. The voltage adjust module 335 then adds the selected adjustment to the current voltage margin to generate a candidate voltage margin.

The voltage clamp 336 receives the candidate voltage margin from the voltage adjust module 335 and determines if the candidate voltage margin falls outside of an upper margin limit and a lower margin limit. If the candidate voltage margin falls within the upper and lower margin limits, the voltage clamp 336 provides the candidate voltage margin as the voltage margin. If the candidate voltage margin falls outside the upper or lower margin limits, the voltage clamp 336 clamps the voltage margin to the corresponding margin limit. Thus, for example, if the candidate voltage margin is greater than the upper margin limit, the voltage clamp 336 sets the voltage margin to the upper margin limit. Similarly, if the candidate voltage margin is less than the lower margin limit, the voltage clamp 336 sets the voltage margin to the lower margin limit. The voltage clamp 336 thus prevents the voltage margin from being increased above or decreased below the corresponding margin limits.

The summer 339 adds the voltage margin provided by the voltage clamp 336 and the nominal voltage as stored at a programmable register (not shown). Based on the sum of the voltage margin and the nominal voltage, the summer 339 generates the value VID. As explained above, the voltage regulator 104 (FIG. 1) employs the VID value to generate GFXVDD. Thus, the embodiment of the VMC 102 illustrated at FIG. 3 periodically adjusts the voltage margin for GFXVDD based on samples of the effective frequency of the clock signal GCLK. The VMC 102 thereby maintains the frequency of the clock signal GCLK within a specified range without consuming excess power.

Figure 4:
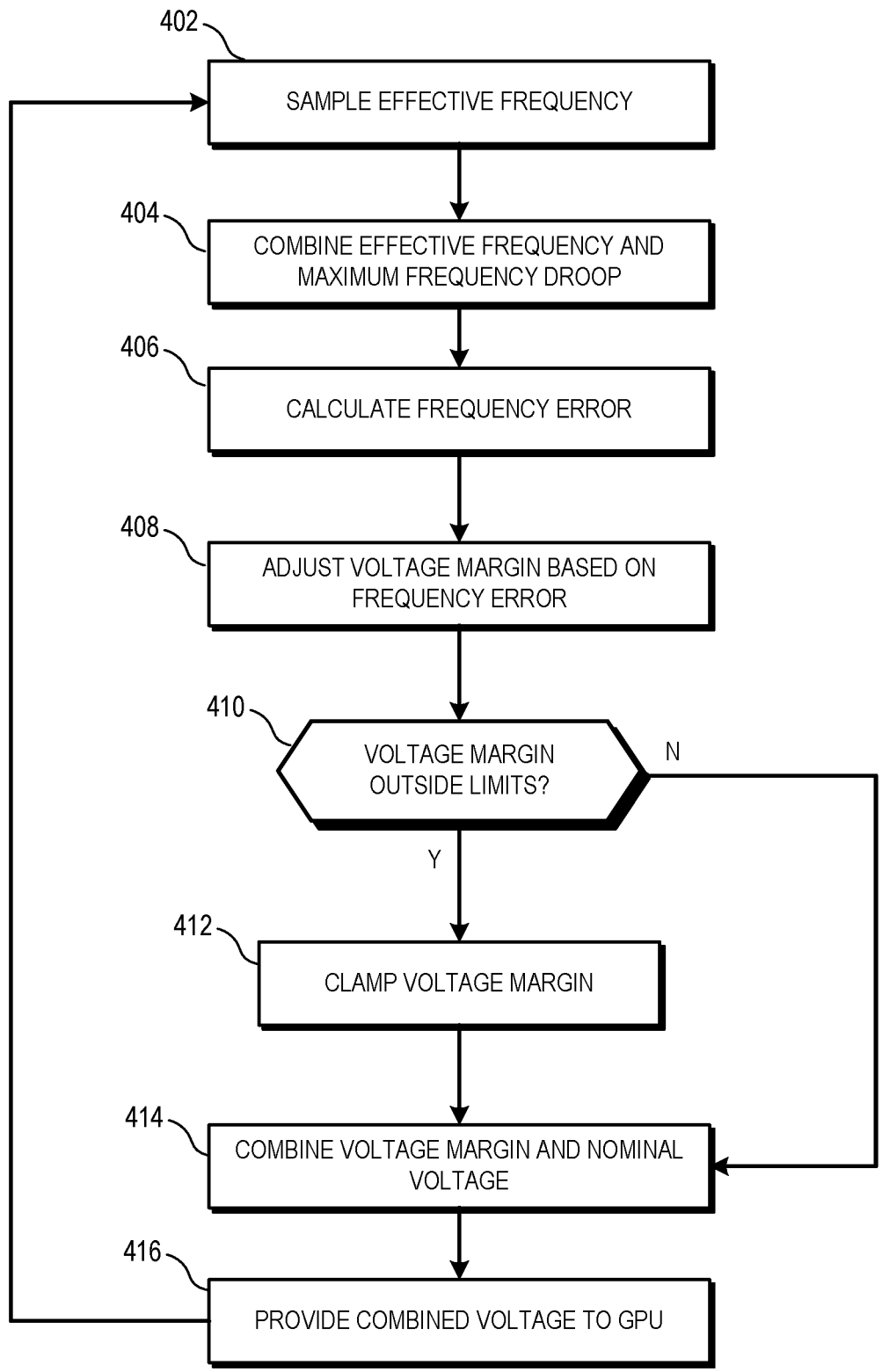
FIG. 4 is a flow diagram of a method of a processor adjusting the voltage margin of a supply voltage based on variations in a sampled clock frequency in accordance with some embodiments.

FIG. 4 illustrates a flow diagram of a method 400 of a processor adjusting the voltage margin of a supply voltage based on variations in a sampled clock frequency in accordance with some embodiments. At block 402, the processor samples the effective frequency of the clock signal. At block 404, the processor combines the sampled clock frequency with a specified maximum frequency droop.

At block 406, the processor identifies a difference between a target frequency for the clock signal and the combined frequencies generated at block 404. The difference is the frequency error between the target frequency and the combined frequencies. At block 408 the processor calculates a candidate voltage margin based on the frequency error identified at block 408. In some embodiments, the processor calculates the candidate voltage margin by identifying a current voltage margin, selecting an adjustment based on the frequency error, and combining the current voltage margin with the selected adjustment.

At block 410, the processor determines if the candidate voltage margin falls outside specified limits. If not, the processor sets the voltage margin to the candidate voltage margin and the method flow proceeds to block 414, described below. If, at block 410, the processor determines that the candidate voltage margin falls outside the specified limits, the method flow proceeds to block 412 and the processor clamps the voltage margin to the corresponding voltage margin limit. The method flow proceeds to block 414.

At block 414, the processor combines the voltage margin and a nominal voltage. At block 416, the processor provides the combined voltage to a module, such as a GPU, whose operations are governed at least in part by the clock signal sampled at block 402. The method flow returns to block 402 and the processor identifies another sample of the effective frequency of the clock signal. The method 400 thus illustrates the operations of a control loop of the processor that maintains the frequency of the clock signal within a limited range by adjusting the voltage margin of a supply voltage for a module of the processor.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   sampling a clock frequency of an adaptable clock signal to identify a first sampled clock frequency, wherein the adaptable clock signal clocks elements at a processor and includes a variable clock frequency based on a supply voltage generated at the processor; and
   adjusting a voltage margin of a voltage supplied to a module of the processor based on the first sampled clock frequency.

2. The method of claim 1, wherein:
   adjusting the voltage margin comprises adjusting the voltage margin to maintain the voltage within a predefined limit.

3. The method of claim 1, further comprising:
   generating the voltage supplied to the module of the processor by combining the voltage margin with a nominal voltage.

4. The method of claim 1, wherein:
   adjusting the voltage margin comprises:
      adjusting the voltage margin by a first voltage adjustment, the first voltage adjustment based on a difference between the first sampled clock frequency and a target clock frequency; and
      clamping the voltage margin to a specified clamped margin value in response to the voltage margin exceeding the clamped margin value.

5. The method of claim 1, wherein:
adjusting the voltage margin comprises adjusting the voltage margin based on a comparison of a first clock frequency based on the first sampled clock frequency to a target clock frequency.

6. The method of claim 5, further comprising:
generating the first clock frequency by combining the first sampled clock frequency with a specified clock frequency adjustment.

7. The method of claim 6, wherein the specified clock frequency adjustment corresponds to a maximum specified variation in clock frequency for the module of the processor.

8. The method of claim 1, wherein sampling the clock frequency to identify the first sampled clock frequency comprises sampling the clock frequency at a first time, and further comprising:
sampling the clock frequency of the adaptable clock signal to identify a second sampled clock frequency; and
adjusting the voltage margin of a voltage supplied to a module of the processor based on the second sampled clock frequency.

9. A method, comprising:
identifying a plurality of clock frequency samples of a clock frequency of an adaptable clock signal, wherein the adaptable clock signal clocks elements at a processor and includes a variable clock frequency based on a supply voltage generated at the processor; and
for each of the plurality of clock frequency samples, adjusting a voltage margin of a voltage supplied to a module of the processor based on the corresponding clock frequency sample to maintain the voltage within a predefined limit.

10. The method of claim 9, further comprising:
generating the voltage supplied to the module of the processor by combining the voltage margin with a nominal voltage.

11. The method of claim 9, further comprising:
clamping the voltage margin to a specified voltage limit satisfying the predefined limit.

12. The method of claim 9, wherein adjusting the voltage margin comprises adjusting the voltage margin by different amounts for different clock frequency samples of the plurality of clock frequency samples.

13. A processor comprising:
a sampling module configured to sample a clock frequency of an adaptable clock signal to identify a first sampled clock frequency, wherein the adaptable clock signal clocks elements at a processor and includes a variable clock frequency based on a supply voltage generated at the processor; and
a voltage control module configured to adjust a voltage margin of a voltage supplied to a module of the processor based on the first sampled clock frequency.

14. The processor of claim 13, wherein the voltage control module is configured to:
adjust the voltage margin to maintain the voltage within a predefined limit.

15. The processor of claim 13 wherein the voltage control module comprises:
a voltage combiner configured to generate the voltage supplied to the module of the processor by combining the voltage margin with a nominal voltage.

16. The processor of claim 13, wherein the voltage control module comprises:
a voltage clamp configured to clamp the voltage margin to a specified clamped margin value in response to the voltage margin exceeding the clamped margin value.

17. The processor of claim 13, wherein the voltage control module comprises:
a comparator configured to adjust the voltage margin based on a comparison of a first clock frequency based on the first sampled clock frequency to a target clock frequency.

18. The processor of claim 17, wherein the voltage control module comprises:
a frequency combiner configured to combine the first sampled clock frequency with a specified clock frequency adjustment.

19. The processor of claim 18, wherein the specified clock frequency adjustment corresponds to a maximum specified variation in clock frequency for the module of the processor.

20. The processor of claim 13, wherein:
sampling the clock frequency to identify the first sampled clock frequency comprises sampling the clock frequency at a first time,
the sampling module is further configured to sample the clock frequency of the adaptable clock signal to identify a second sampled clock frequency, and
the voltage control module is further configured to adjust the voltage margin of a voltage supplied to a module of the processor based on the second sampled clock frequency.

* * * * *